United States Patent
Schick et al.

(10) Patent No.: US 12,475,204 B2
(45) Date of Patent: Nov. 18, 2025

(54) METHOD FOR AUTHENTICATING A USER OF A MOBILE DEVICE

(71) Applicant: TRINAMIX GMBH, Ludwigshafen am Rhein (DE)

(72) Inventors: Friedrich Schick, Ludwigshafen am Rhein (DE); Peter Schillen, Ludwigshafen am Rhein (DE); Benjamin Guthier, Ludwigshafen am Rhein (DE); Patrick Schindler, Ludwigshafen am Rhein (DE); Dimitri Butov, Ludwigshafen am Rhein (DE); Mark Prediger, Ludwigshafen am Rhein (DE)

(73) Assignee: TRINAMIX GMBH, Ludwigshafen Am Rhein (DE)

( * ) Notice: Subject to any disclaimer, the term of this patent is extended or adjusted under 35 U.S.C. 154(b) by 101 days.

(21) Appl. No.: 18/565,560

(22) PCT Filed: Jun. 14, 2022

(86) PCT No.: PCT/EP2022/066188
§ 371 (c)(1),
(2) Date: Nov. 30, 2023

(87) PCT Pub. No.: WO2022/263452
PCT Pub. Date: Dec. 22, 2022

(65) Prior Publication Data
US 2025/0045368 A1    Feb. 6, 2025

(30) Foreign Application Priority Data

Jun. 15, 2021    (EP) .................................... 21179598

(51) Int. Cl.
*G06F 21/32*    (2013.01)
*G06F 21/53*    (2013.01)
(Continued)

(52) U.S. Cl.
CPC .............. *G06F 21/32* (2013.01); *G06F 21/53* (2013.01); *G06V 10/82* (2022.01); *G06V 40/167* (2022.01); *G06F 2221/2149* (2013.01)

(58) Field of Classification Search
CPC ... G06F 21/32; G06F 21/53; G06F 2221/2105
See application file for complete search history.

(56) References Cited

U.S. PATENT DOCUMENTS

| 2011/0222744 A1 | 9/2011 | Kim et al. |
| 2019/0205518 A1* | 7/2019 | Moulin ................ G06V 40/171 |

(Continued)

FOREIGN PATENT DOCUMENTS

CN    105138973 A    12/2015

OTHER PUBLICATIONS

Android Open Source Project Section 7.3.10, Android 11 Compatability Definition, "Biometric Sensors" obtained from: source.android.com/compatibility/11/android-11-cdd#7_3_10_biometric_sensors on Jan. 18, 2024 (6 pages).

(Continued)

*Primary Examiner* — Thaddeus J Plecha
(74) *Attorney, Agent, or Firm* — Armstrong Teasdale LLP

(57) ABSTRACT

Disclosed herein is a method for authenticating a user of a mobile device. The method includes:
a) imaging at least one first image of a face by using at least one camera of the mobile device;
b) providing the at least one first image to a regular execution environment of a processor of the mobile device and providing the at least one first image to a trusted execution environment of the processor;
c) analyzing the at least one first image using at least one trained model in the regular execution environment thereby determining a multi-dimensional vector comprising image information; and
d) a face verification step.

17 Claims, 2 Drawing Sheets

(51) Int. Cl.
*G06V 10/82* (2022.01)
*G06V 40/16* (2022.01)

(56) References Cited

U.S. PATENT DOCUMENTS

2021/0103470 A1\* 4/2021 Yao .................... G06F 9/505
2021/0173916 A1\* 6/2021 Ortiz .................. H04L 9/3231

OTHER PUBLICATIONS

Android Open Source Project, Measuring Biometric Unlock Security obtained from: source.android.com/security/biometric/measure on Jan. 18, 2024 (21 pages).
GlobalPlatform Technology, TEE System Architecture, Public Release, Version 1.2, 50 pages (2018).
Huang et al., "Labeled Faces in the Wild: A Database for Studying Face Recognition in Unconstrained Environments", Technical Report 07-49, University of Massachusetts, Amherst, 11 pages (2007).
Mai et al., "On the Reconstruction of Face Images from Deep Face Templates", Arxiv.org, Cornell University Library, 15 pages (2017).
Schroff et al., "FaceNet: A Unified Embedding for Face Recognition and Clustering", arXiv:1503.03832, 10 pages (2015).
Sutskever et al., "Sequence to Sequence Learning with Neural Networks", obtained from: papers.nips.cc/paper/2014/file/a14ac55a4f27472c5d894ec1c3c743d2-Paper.pdf on Jan. 18, 2024 (9 pages).
Szegedy et al., "Going deeper with convolutions", , arXiv:1409.4842v1, 12 pages (2014).
Wolf et al., "Face Recognition in Unconstrained Videos with Matched Background Similarity", in IEEE Conf. on CVPR, 2011, or Google® Facial Expression Comparison dataset, pp. 529-534.
Zeiler et al., "Visualizing and Understanding Convolutional Networks", CoRR, abs/1311.2901, 11 pages (2013).
International Search Report and Written Opinion for corresponding PCT/EP22/66188 mailed Sep. 13, 2022, 14 pages.

\* cited by examiner

METHOD FOR AUTHENTICATING A USER OF A MOBILE DEVICE

CROSS-REFERENCE TO RELATED APPLICATIONS

This application is a U.S. National Phase Application of International Patent Application No. PCT/EP22/66188, filed Jun. 14, 2022, and claims priority to patent application Ser. No. 21/179,598.4, filed Jun. 15, 2021, each of which are hereby incorporated by reference herein.

FIELD OF THE INVENTION

The invention relates to a method for authenticating a user of a mobile device, a method for authorization, a mobile device and various uses of the mobile device. The devices, methods and uses according to the present invention specifically may be employed for example in various areas of daily life, security technology, gaming, traffic technology, production technology, photography such as digital photography or video photography for arts, documentation or technical purposes, safety technology, information technology, agriculture, crop protection, maintenance, cosmetics, medical technology or in the sciences. However, other applications are also possible.

PRIOR ART

Use of trusted execution environment (TEE)-technology is known to be used in mobile devices such as smartphones or tablet computers, see e.g. en.wikipedia.org/wiki/Trusted_execution_environment. However, the trusted execution environment of a processor of mobile devices has limited computing power and memory capacity compared to the main processor, in particular its regular execution environment.

Mobile devices are used in a wide range of applications often requiring security For example, mobile devices may be used for payment. In order to approve a payment process, the identity of a user is usually checked using a camera recording of his face. A neural network may be used for a facial analysis and clarifying the identity of the user based on specified criteria. Based on the result the payment process may be approved. This share can be tampered with in the regular and unsafe environment of the processor of the mobile device. But, due to limited computing power and memory capacity, it is not possible to carry out the facial authentication and/or recognition in the trusted execution environment. Performing image analysis in the unsecure regular execution environment may expose the recording of the user's face to be accessible such as for modification and, thus, to a security problem.

US 2021/173916 A1 describes systems, devices, methods, and computer readable media in various embodiments relating to generating a dynamic challenge passphrase data object. The method includes establishing, a plurality of data record clusters, representing a mutually exclusive set of structured data records of an individual, ranking the plurality of feature data fields based on a determined contribution value of each feature data field relative to the establishing of the data record cluster, and identifying, using the ranked plurality of feature data fields, a first and a second feature data field of the plurality of feature data fields. The method includes generating the dynamic challenge passphrase data object, wherein the first or the second feature data field is used to establish a statement string portion, and a remaining one of the first or the second feature data field is used to establish a question string portion and a correct response string.

US 2019/205518 A1 describes a method used in a mobile equipment for authenticating or identifying a user based on his face. The method includes acquiring a sequence of biometric face sample corresponding to successive image frames of the user in a Trusted Execution Environment of the mobile equipment, and, in the Trusted Execution Environment, modifying or replacing some of the biometric face samples in the sequence, so as to generate a modified sequence with test biometric face samples. The method includes transmitting the modified sequence to a Rich Execution Environment of the mobile equipment, and classifying at least one portion of the biometric face samples using a classifier in the Rich Execution Environment, so as to generate for each classified biometric face sample a set of intermediary outputs and a classification result. The method also includes, for each classified biometric face sample, sending at least some of the intermediary outputs or classification result, and/or a digest of the intermediary outputs, to the Trusted Execution Environment. The method further includes, for at least one test biometric face sample, verifying the at least some of the intermediary outputs and/or result and/or digest in the Trusted Execution Environment.

CN 105 138 973 A describes face authentication method and device. The method comprises the following steps: sequentially extracting multiple levels of feature vectors from a to-be-authenticated face image and a face image template with a multi-level depth convolutional network which is subjected to multi-layer classified network joint training in advance; sequentially mapping the multiple levels of feature vectors into unified dimension feature vectors through a unified dimension linear mapping matrix; connecting the unified dimension feature vectors into joint feature vectors in series; carrying out dimension-reducing mapping on the joint feature vectors through a linear dimension-reducing mapping matrix; and normalizing cosine values with absolute values through linear discriminant analysis, and carrying out comparison and authentication on the obtained feature vectors of the to-be-authenticated face image and feature vectors of the face image template.

PROBLEM ADDRESSED BY THE INVENTION

It is therefore an object of the present invention to provide devices and methods facing the above-mentioned technical challenges of known devices and methods. Specifically, it is an object of the present invention to provide devices and methods which allow authentication of a user of a mobile device with enhanced security.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are pre-sent. As an example, the expressions "A has B", "A comprises B" and "A includes B"

may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way.

The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such a way with other optional or non-optional features of the invention.

In a first aspect of the present invention a method for authenticating a user of a mobile device is disclosed.

The term "mobile device" as used herein is a broad term and is to be given its ordinary and customary meaning to a person of ordinary skill in the art and is not to be limited to a special or customized meaning. The term specifically may refer, without limitation, to a mobile electronics device, more specifically to a mobile communication device such as a cell phone or smart phone. Additionally or alternatively, the mobile device may also refer to a tablet computer or another type of portable computer.

The term "user" as used herein is a broad term and is to be given its ordinary and customary meaning to a person of ordinary skill in the art and is not to be limited to a special or customized meaning. The term specifically may refer, without limitation, to a person using the mobile device. The user may be an owner of the mobile device and/or otherwise authorized person.

The term "authentication" as used herein is a broad term and is to be given its ordinary and customary meaning to a person of ordinary skill in the art and is not to be limited to a special or customized meaning. The term specifically may refer, without limitation, to verifying an identity of a user. Specifically, the authentication may comprise distinguishing between the user from other humans or objects, in particular between authorized access from non-authorized accesses. The authentication may comprise verifying identity of a respective user and/or assigning identity to a user. The authentication may comprise generating and/or providing identity information, e.g. to other devices or units such as to at least one authorization unit for authorization for performing a payment process. The identify information may be proofed by the authentication. For example, the identity information may be and/or may comprise at least one identity token. In case of successful authentication an image of a face recorded by a camera of the mobile device may be verified to be an image of the user's face and/or the identity of the user is verified.

The method comprises the following steps:
a) imaging at least one first image of a face by using at least one camera of the mobile device;
b) providing the first image to a regular execution environment of a processor of the mobile device and providing the first image to a trusted execution environment of the processor; c) analyzing the first image using at least one trained model in the regular execution environment thereby determining a multi-dimensional vector comprising image information;
d) a face verification step comprising:
di) providing the multi-dimensional vector to the trusted execution environment,
dii) determining a second image from the multi-dimensional vector in the trusted execution environment by using at least one decoder, and
diii) comparing the first image and the second image, wherein in case the first image and the second image are identical the multi-dimensional vector is verified;
div) in case the multi-dimensional vector is verified, the verified multi-dimensional vector is compared to a stored multi-dimensional vector of the user's face in the trusted execution environment, wherein in case the multi-dimensional vector and the stored multi-dimensional vector of the user's face are identical the user is authenticated.

The method steps may be performed in the given order or may be performed in a different order. Further, one or more additional method steps may be present which are not listed. Further, one, more than one or even all of the method steps may be performed repeatedly.

The term "camera" as used herein is a broad term and is to be given its ordinary and customary meaning to a person of ordinary skill in the art and is not to be limited to a special or customized meaning. The term specifically may refer, without limitation, to a device having at least one imaging element configured for recording or capturing spatially resolved one-dimensional, two-dimensional or even three-dimensional optical data or information. As an example, the camera may comprise at least one camera chip, such as at least one CCD chip and/or at least one CMOS chip configured for recording images. For example, the camera may be a color camera, as will be described in detail below, comprising at least three color pixels. The camera may be a color CMOS camera. For example, the camera may comprise black and white pixels and color pixels. The color pixels and the black and white pixels may be combined internally in the camera. The camera may comprise at least one color camera and at least one black and white camera, such as a black and white CMOS. The camera may comprise at least one black and white CMOS chip. The camera generally may comprise a one-dimensional or two-dimensional array of image sensors, such as pixels.

The camera may comprise further elements, such as one or more optical elements, e.g. one or more lenses. As an example, the camera may be a fix-focus camera, having at least one lens which is fixedly adjusted with respect to the camera. Alternatively, however, the camera may also comprise one or more variable lenses which may be adjusted, automatically or manually. Other cameras, however, are feasible.

The term "imaging" as used herein is a broad term and is to be given its ordinary and customary meaning to a person of ordinary skill in the art and is not to be limited to a special or customized meaning. The term specifically may refer, without limitation, to capturing and/or generating and/or determining and/or recording at least one image by using the camera. The imaging may comprise capturing a single image and/or a plurality of images such as a sequence of images. For example, the imaging may comprise recording continuously a sequence of images such as a video or a movie. The imaging may be initiated by the user action or may automatically be initiated, e.g. once the presence of the at least one object within a field of view and/or within a predetermined sector of the field of view of the camera is automatically detected. The imaging may be supported by the processor of the mobile device.

As used herein, without limitation, the term "image" specifically may relate to data recorded by using a camera, such as a plurality of electronic readings from the camera, such as the pixels of the camera chip. The first image may be an initial image imaged by using the camera. The first image may comprise raw image data or may be a pre-processed image. For example, the pre-processing may comprise applying at least one filter to the raw image data and/or at least one background correction and/or at least one background subtraction. The first image may comprise a scene comprising the face. The pre-processing may comprise one or more of performing a face detection and/or selecting a region of interest. The region of interest may be determined manually or may be determined automatically, such as by recognizing a feature within the first image.

The term "processor" as used herein is a broad term and is to be given its ordinary and customary meaning to a person of ordinary skill in the art and is not to be limited to a special or customized meaning. The term specifically may refer, without limitation, to an arbitrary logic circuitry configured for performing basic operations of a computer or system, and/or, generally, to a device which is configured for performing calculations or logic operations. In particular, the processor may be configured for processing basic instructions that drive the computer or system. As an example, the processor may comprise at least one arithmetic logic unit (ALU), at least one floating-point unit (FPU), such as a math co-processor or a numeric co-processor, a plurality of registers, specifically registers configured for supplying operands to the ALU and storing results of operations, and a memory, such as an L1 and L2 cache memory. In particular, the processor may be a multi-core processor. Specifically, the processor may be or may comprise a central processing unit (CPU). Additionally or alternatively, the processor may be or may comprise a microprocessor, thus specifically the processor's elements may be contained in one single integrated circuitry (IC) chip. Additionally or alternatively, the processor may be or may comprise one or more application-specific integrated circuits (ASICs) and/or one or more field-programmable gate arrays (FPGAs) and/or one or more tensor processing unit (TPU) and/or one or more chip, such as a dedicated machine learning optimized chip, or the like. The processor specifically may be configured, such as by software programming, for performing one or more evaluation operations.

The term "execution environment" as used herein is a broad term and is to be given its ordinary and customary meaning to a person of ordinary skill in the art and is not to be limited to a special or customized meaning. The term specifically may refer, without limitation, to a set of hardware and software components providing facilities configured for supporting running of applications. The execution environment may be designed as described in GlobalPlatform Technology, TEE System Architecture, Version 1.2, Public Release November 2018, document reference: GPD_SPE_009, or www.qualcomm.com/media/documents/files/guard-your-data-with-the-qualcomm-snapdragon-mobile-platform.pdf, or www.arm.com/why-arm/technologies/trustzone-for-cortex-a/tee-reference-documentation. Specifically, the execution environment may comprise at least one hardware processing unit, at least one memory, in particular volatile memory and non-volatile memory, connections between the hardware processing unit and other hardware resources, and peripheral interfaces.

The term "regular execution environment", also denoted as Rich Execution Environment, as used herein is a broad term and is to be given its ordinary and customary meaning to a person of ordinary skill in the art and is not to be limited to a special or customized meaning. The regular execution environment may be designed as described in GlobalPlatform Technology, TEE System Architecture, Version 1.2, Public Release November 2018, document reference: GPD_SPE_009, or www.qualcomm.com/media/documents/files/guard-your-data-with-the-qualcomm-snapdragon-mobile-platform.pdf, or www.arm.com/why-arm/technologies/trustzone-for-cortex-a/tee-reference-documentation. The term "regular execution environment" specifically may refer, without limitation, to an execution environment of the processor comprising at least one device operating system (OS) and/or Rich operating system (Rich OS) and all other components of the device, in particular at least one system-on-chip (SoC), other discrete components, firmware, and software, which are configured for executing, hosting, and supporting the OS and/or Rich OS. The SoC may be an electronic system all of whose components are included in a single integrated circuit. The regular execution environment may exclude any trusted execution environment and secure elements (SEs) included in the mobile device. Specifically, the regular execution environment may be everything outside of the trusted execution environment. The regular execution environment, in particular due to the size and needs of the OS and/or Rich OS, may run in an execution environment outside of hardware of the trusted execution environment. The regular execution environment may have much lower physical security boundaries compared to the trusted execution environment. Thus, the regular execution environment may be considered as untrusted. However, internal trust structures may be present in the regular execution environment.

The term "trusted execution environment (TEE)", as used herein is a broad term and is to be given its ordinary and customary meaning to a person of ordinary skill in the art and is not to be limited to a special or customized meaning. The trusted execution environment may be designed as described in GlobalPlatform Technology, TEE System Architecture, Version 1.2, Public Release November 2018, document reference: GPD_SPE_009, or www.qualcomm.com/media/documents/files/guard-your-data-with-the-qualcomm-snapdragon-mobile-platform.pdf, or www.arm.com/why-arm/technologies/trustzone-for-cortex-a/tee-reference-documentation. The term "trusted execution environment" specifically may refer, without limitation, to an execution environment comprise at least one security capability and fulfills at least one security requirement. The trusted execution environment may be configured for protecting assets within the trusted execution environment from general software attacks. The trusted execution environment may be configured for defining rigid safeguards as to data and functions that a program can access. The trusted execution environment may be configured for resisting a set of defined threats. Multiple technologies are known for implementing a trusted execution environment and the level of security achieved may vary accordingly. Specifically, the trusted execution environment may fulfill security requirements as described in source.android.com/compatibility/11/ android-11-cdd#7_3_10_biometric_sensors. The TEE may operate, in particular while biometric based authentication or enrollment is happening, the camera in a mode that prevents camera frames from being read or altered outside the TEE or a chip with a secure channel to the TEE. For RGB single-camera solutions, the camera frames may be readable outside the TEE to support operations such as preview for enrollment, but may still not be alterable. The TEE may not allow unencrypted access to identifiable biometric data or any data derived from it (such as embeddings) to parts of the processor outside the context of the TEE. The TEE may have a secure processing pipeline such that an operating system or kernel compromise cannot allow data to be directly injected to falsely authenticate as the user. The TEE may have a hardware-backed keystore implementation. The TEE may have all identifiable data encrypted and cryptographically authenticated such that they cannot be acquired, read or altered outside of the TEE or a chip with a secure channel to the TEE. The TEE may prevent adding new biometrics without first establishing a chain of trust by having the user confirm existing or add a new device credential, e.g. PIN and/or pattern and/or password, that's secured by TEE.

The trusted execution environment may be an execution environment isolated from the regular execution environment. The trusted execution environment may be isolated from the regular execution environment by one or more of physical isolation, hardware logic based isolation, or cryptographic isolation methods. Specifically, the trusted execution environment may be isolated from the regular execution environment by electronic access control through TEE system hardware, that can be configured by TEE resident boot or run-time software.

The term "providing" the first image as used herein is a broad term and is to be given its ordinary and customary meaning to a person of ordinary skill in the art and is not to be limited to a special or customized meaning. The term specifically may refer, without limitation, to transferring the image data recorded by the camera to the processor of the mobile device, in particular to the regular execution environment and to the trusted execution environment. The first image may be provided to the regular execution environment via a regular path. The regular path may be an untrusted path. The regular path may be configured for allowing access by software within the regular execution environment and/or the trusted execution environment. The first image may be provided to the trusted execution environment via a secure path, wherein the secure path may be configured for preventing the first image to be derived and/or modified by any software within the regular execution environment.

The analyzing of the first image is performed in the regular execution environment. Thus, high computing power and memory capacity may be available for analyzing the first image.

The analyzing in step c) may comprise one or more of filtering and convoluting of the first image. The trained model may comprise at least one face recognition model. The analyzing of the first image may be performed by using a face recognition system, such as FaceNet. Thus, the face recognitions system may be designed as described in Florian Schroff, Dmitry Kalenichenko, James Philbin, "FaceNet: A Unified Embedding for Face Recognition and Clustering", arXiv:1503.03832.

The term "trained model" as used herein is a broad term and is to be given its ordinary and customary meaning to a person of ordinary skill in the art and is not to be limited to a special or customized meaning. The term specifically may refer, without limitation, to a mathematical model trained on at least one training data set. The trained model can be re-trained and/or updated based on additional training data. The trained model may be trained by using machine learning. The term "machine learning" as used herein is a broad term and is to be given its ordinary and customary meaning to a person of ordinary skill in the art and is not to be limited to a special or customized meaning. The term specifically may refer, without limitation, to a method of using artificial intelligence (AI) for automatically model building, in particular for parametrizing models. The trained model may be parametrized by using one or more of machine learning, deep learning, neural networks, or other form of artificial intelligence. The trained model may be trained using records of training data. A record of training data may comprise training input data and corresponding training output data. The training output data of a record of training data may be the result that is expected to be produced by the model when being given the training input data of the same record of training data as input. The deviation between this expected result and the actual result produced by the algorithm may be observed and rated by means of a "loss function". This loss function may be used as a feedback for adjusting the parameters of the model. For example, the parameters may be adjusted with the optimization goal of minimizing the values of the loss function that result when all training input data is fed into the model and the outcome is compared with the corresponding training output data. The result of this training may be that given a relatively small number of records of training data as "ground truth", the model is enabled to perform its job well for a number of records of input data higher by many orders of magnitude. Thus, the model may comprise at least one algorithm and model parameters. Parameters of the model may be generated by using at least one artificial neural network.

The trained model may comprises at least one convolutional neural network. For example, the convolutional neural network may be designed as described in M. D. Zeiler and R. Fergus, "Visualizing and understanding convolutional networks", CoRR, abs/1311.2901, 2013, or C. Szegedy et al., "Going deeper with convolutions", CoRR, abs/ 1409.4842, 2014. For more details with respect to convolutional neural network for the face recognition system reference is made to Florian Schroff, Dmitry Kalenichenko, James Philbin, "FaceNet: A Unified Embedding for Face Recognition and Clustering", arXiv:1503.03832.

As training data labelled image data from an image database may be used. Specifically, labeled faces may be used from one or more of G. B. Huang, M. Ramesh, T. Berg, and E. Learned-Miller, "Labeled faces in the wild: A database for studying face recognition in unconstrained environments", Technical Report 07-49, University of Massachusetts, Amherst, October 2007, the Youtube® Faces Database as described in L. Wolf, T. Hassner, and I. Maoz, "Face recognition in unconstrained videos with matched background similarity", in IEEE Conf. on CVPR, 2011, or Google® Facial Expression Comparison dataset. The training of the convolutional neural network may be performed as described in Florian Schroff, Dmitry Kalenichenko, James Philbin, "FaceNet: A Unified Embedding for Face Recognition and Clustering", arXiv:1503.03832.

The output of the analyzing in step c) using the trained model may be a multi-dimensional vector. The multi-dimensional vector may be an embedding, specifically a lower-dimensional representation of the first image. Determining a multi-dimensional vector from the first image as input to the trained model may be performed as described in Florian Schroff, Dmitry Kalenichenko, James Philbin, "FaceNet: A Unified Embedding for Face Recognition and Clustering", arXiv:1503.03832. Specifically, the trained model may determine from the first image a vector of 128 numbers. The entries of the multi-dimensional vector may be features of the imaged face. The image information may be embedded and/or mapped into the multi-dimensional vector. The image information may be any parameters of the first image characterizing and/or defining the first image. The image information may be information allowing to a comparison to another image information to verify the similarity of a person's face. The multi-dimensional vector is provided to the trusted execution environment. The providing of the multi-dimensional vector may be performed by using at least one interface between the regular execution environment and the trusted execution environment, in particular by access of the trusted execution environment to the regular execution environment.

In the trusted execution environment, a second image from the multi-dimensional vector is determined by using the at least one decoder. The second image may be an image reconstructed from the multi-dimensional vector. The determining of the second image may comprises the decoder reconstructing the image of the user's face from the multi-dimensional vector. The term "decoder" as used herein is a broad term and is to be given its ordinary and customary meaning to a person of ordinary skill in the art and is not to be limited to a special or customized meaning. The term specifically may refer, without limitation, to at least one element of the trusted execution environment configured for reconstructing an image from embeddings, in particular from the multi-dimensional vector. Such decoders and their working principles are generally known to the skilled person, e.g. as described in papers.nips.cc/paper/2014/file/a14ac55a4f27472c5d894ec1c3c743d2-Paper.pdf.

The method comprises comparing the first image and the second image. The comparison may be performed by the processor in the trusted execution environment. The comparison may comprise comparing at least one feature of the first image and the second image, in particular a plurality of features. The features used for comparison may be predefined. The features of the first image and the feature of the second image are based on identical image data, but the features were generated by using different algorithms. In particular the features comprised by the multi-dimensional vector were determined by the face recognition algorithm as described above. The multi-dimensional vector was determined from the first image which is also deposited in the TEE. Additionally or alternatively, the first image and the second image may be compared with a similarity measure, e.g. pixelwise. In case the first image and the second image are identical the multi-dimensional vector is verified. The term "identical" as used herein is a broad term and is to be given its ordinary and customary meaning to a person of ordinary skill in the art and is not to be limited to a special or customized meaning. The term specifically may refer, without limitation, to identical at least within tolerances. The first image and the second image may be considered identical within a tolerance range of ±30%, preferably of ±10%, more preferably of ±5%.

In case the multi-dimensional vector is verified, the verified multi-dimensional vector is compared to a stored multi-dimensional vector of the user's face in the trusted execution environment. Otherwise, the procedure may be aborted and/or restarted. In case the multi-dimensional vector and the stored multi-dimensional vector of the user's face are identical the user is authenticated. The multi-dimensional vector of the user's face may be stored in at least one memory of the TEE. As outlined above, the embedding describes a mathematical representation of face-features which can be compared to each other, e.g. by using a scalar product.

Performing image analysis in the unsecure regular execution environment may allow using the full computing power and memory capacity of the regular execution environment. Proofing the result of the image analysis obtained in the regular execution environment by comparing to the first image stored in the trusted execution environment allows authentication of the user with enhanced security.

In a further aspect a method for authorization of a user is disclosed. The method comprises performing a method for authenticating a user of a mobile device according to the present invention. The method further comprises the trusted execution environment outputting a signal for authorizing a process step. The process step comprises one or more of payment, signing of documents, access of the mobile device, enabling applications such as BiometricPrompt and/or FIDO2 APIs, see source.android.com/security/biometric/measure.

The term "authorization" as used herein is a broad term and is to be given its ordinary and customary meaning to a person of ordinary skill in the art and is not to be limited to a special or customized meaning. The term specifically may refer, without limitation, to a process of assigning permission to the user to performing the further process step.

For details, options and definitions, reference may be made to the method as discussed above.

In a further aspect a computer program is proposed for authenticating a user of a mobile device configured for causing a computer or a computer network to fully or partially perform the method for authenticating a user according to the present invention, when executed on the computer or the computer network, wherein the computer program is configured for performing and/or executing at least steps a) to d) of the method for authenticating according to the present invention. Similarly, a computer-readable storage medium is disclosed, comprising instructions which, when the program is executed by computer or computer network, cause the computer or computer network to perform the method for authentication according to the present invention invention, such as according to any one of the embodiments disclosed above and/or any one of the embodiments disclosed in further detail below. As used herein, the term "computer-readable storage medium" specifically may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

Thus, specifically, one, more than one or even all of method steps a) to d) as indicated above may be performed by using a computer or a computer network, preferably by using a computer program.

Further disclosed and proposed herein is a computer program product having program code means, in order to perform the method according to the present invention in one or more of the embodiments enclosed herein when the program is executed on a computer or computer network. Specifically, the program code means may be stored on a computer-readable data carrier and/or on a computer-readable storage medium.

Further disclosed and proposed herein is a data carrier having a data structure stored thereon, which, after loading into a computer or computer network, such as into a working memory or main memory of the computer or computer network, may execute the method according to one or more of the embodiments disclosed herein.

Further disclosed and proposed herein is a non-transient computer-readable medium including instructions that, when executed by one or more processors, cause the one or more processors to perform the method according to one or more of the embodiments disclosed herein.

Further disclosed and proposed herein is a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier and/or on a computer-readable storage medium. Specifically, the computer program product may be distributed over a data network.

Further, disclosed and proposed herein is a modulated data signal which contains instructions readable by a computer system or computer network, for performing the method according to one or more of the embodiments disclosed herein.

Specifically, further disclosed herein are:
a computer or computer network comprising at least one processor, wherein the processor is adapted to perform the method according to one of the embodiments described in this description,
a computer loadable data structure that is adapted to perform the method according to one of the embodiments described in this description while the data structure is being executed on a computer,
a computer program, wherein the computer program is adapted to perform the method according to one of the embodiments described in this description while the program is being executed on a computer,
a computer program comprising program means for performing the method according to one of the embodiments described in this description while the computer program is being executed on a computer or on a computer network,
a computer program comprising program means according to the preceding embodiment, wherein the program means are stored on a storage medium readable to a computer,
a storage medium, wherein a data structure is stored on the storage medium and wherein the data structure is adapted to perform the method according to one of the embodiments described in this description after having been loaded into a main and/or working storage of a computer or of a computer network, and
a computer program product having program code means, wherein the program code means can be stored or are stored on a storage medium, for performing the method according to one of the embodiments described in this description, if the program code means are executed on a computer or on a computer network.

In a further aspect of the present invention, a computer program is disclosed for authorization a user of a mobile device. The computer program comprises instructions which, when the program is executed by a computer or computer network, cause the computer or computer network to perform the method for authorization according to the present invention, such as according to any one of the embodiments disclosed above and/or any one of the embodiments disclosed in further detail below. Similarly, a computer-readable storage medium is disclosed, comprising instructions which, when the program is executed by computer or computer network, cause the computer or computer network to perform the method for authorization according to the present invention, such as according to any one of the embodiments disclosed above and/or any one of the embodiments disclosed in further detail below.

In a further aspect a mobile device is disclosed. The mobile device comprises at least one camera and at least one processor. The mobile device being configured for performing at least steps a) to d) of the method for authentication according to the present invention and/or for performing the method for authorization according to the present invention, such as according to any one of the embodiments disclosed above and/or any one of the embodiments disclosed in further detail below. For details, options and definitions, reference may be made to the methods as discussed above.

In a further aspect of the present invention, use of the mobile device according to the present invention, such as according to one or more of the embodiments given above or given in further detail below, is proposed, for a purpose of use, selected from the group consisting of: payment, signing of documents, enabling applications such as BiometricPrompt and/or FIDO2 APIs, see source.android.com/security/biometric/measure.

Overall, in the context of the present invention, the following embodiments are regarded as preferred:

Embodiment 1. Method for authenticating a user of a mobile device comprising the following steps:
a) imaging at least one first image of a face by using at least one camera of the mobile device;
b) providing the first image to a regular execution environment of a processor of the mobile device and providing the first image to a trusted execution environment of the processor;
c) analyzing the first image using at least one trained model in the regular execution environment thereby determining a multi-dimensional vector comprising image information;
d) a face verification step comprising:
di) providing the multi-dimensional vector to the trusted execution environment,
dii) determining a second image from the multi-dimensional vector in the trusted execution environment by using at least one decoder, and
diii) comparing the first image and the second image, wherein in case the first image and the second image are identical the multi-dimensional vector is verified;
div) in case the multi-dimensional vector is verified, the verified multi-dimensional vector is compared to a stored multi-dimensional vector of the user's face in the trusted execution environment, wherein in case the multi-dimensional vector and the stored multi-dimensional vector of the user's face are identical the user is authenticated.

Embodiment 2. The method according to the preceding embodiment, wherein the trusted execution environment is an execution environment isolated from the regular execution environment.

Embodiment 3. The method according to the preceding embodiment, wherein the trusted execution environment is isolated from the regular execution environment by one or more of physical isolation, hardware logic based isolation, or cryptographic isolation methods.

Embodiment 4. The method according to any one of the preceding embodiments, wherein the trusted execution environment comprises at least one security capability and fulfills at least one security requirement.

Embodiment 5. The method according to any one of the preceding embodiments, wherein the first image is provided to the regular execution environment via a regular path, wherein the regular path is configured for allowing access by software within the regular execution environment and/or the trusted execution environment.

Embodiment 6. The method according to any one of the preceding embodiments, wherein the first image is provided to the trusted execution environment via a secure path, wherein the secure path is configured for preventing the first image to be derived and/or modified by any software within the regular execution environment.

Embodiment 7. The method according to any one of the preceding embodiments, wherein the determining of the second image comprises the decoder reconstructing the image of the user's face from the multi-dimensional vector.

Embodiment 8. The method according to any one of the preceding embodiments, wherein the trained model comprises at least one face recognition model.

Embodiment 9. The method according to any one of the preceding embodiments, wherein the trained model comprises at least one convolutional neural network.

Embodiment 10. The method according to the preceding embodiments, wherein the analyzing in step c) comprises one or more of filtering and convoluting of the first image.

Embodiment 11. Method for authorization of a user, wherein the method comprises performing a method for authenticating a user of a mobile device according to any one of the preceding embodiments, wherein the method further comprises the trusted execution environment outputting a signal for authorizing a process step, wherein the process step comprises one or more of payment, signing of documents, access of the mobile device, enabling applications.

Embodiment 12. Computer program for authenticating a user of a mobile device configured for causing a computer or a computer network to fully or partially perform the method for authenticating a user according to any one of the preceding embodiments relating to a method for authenticating, when executed on the computer or the computer network, wherein the computer program is configured for performing and/or executing at least steps a) to d) of the method for authenticating according to any one of the preceding embodiments relating to a method for authenticating.

Embodiment 13. Computer program for authorization a user of a mobile device configured for causing a computer or a computer network to fully or partially perform the method for authorization a user according to embodiment 11, when executed on the computer or the computer network.

Embodiment 14. A computer-readable storage medium comprising instructions which, when executed by a computer or computer network, cause to carry out at least steps a) to d) of the method according to any one of the preceding embodiments referring to a method relating to authentication and/or to carry out a method for authorization of a user according to embodiment 11.

Embodiment 15. A mobile device comprising at least one camera and at least one processor, the mobile device being configured for performing at least steps a) to d) of the method for authentication according to any one of the preceding embodiments referring to a method for authentication and/or for performing the method for authorization according to embodiment 11.

Embodiment 16. Use of the mobile device according to the preceding embodiment for one or more of payment, signing of documents.

BRIEF DESCRIPTION OF THE FIGURES

Further optional details and features of the invention are evident from the description of preferred exemplary embodiments which follows in conjunction with the dependent claims. In this context, the particular features may be implemented in an isolated fashion or in combination with other features. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

DETAILED DESCRIPTION OF THE EMBODIMENTS

Figure 1:
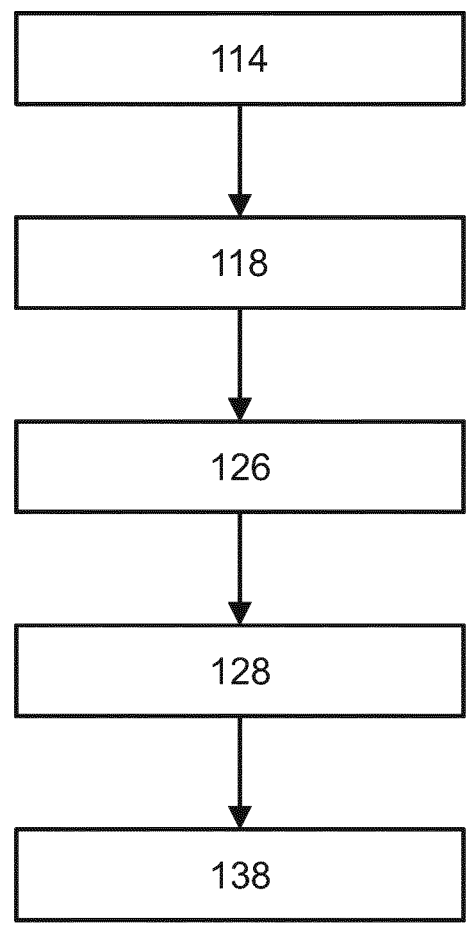
FIG. 1 shows an embodiment of the method for authenticating a user of a mobile device.
Figure 2:
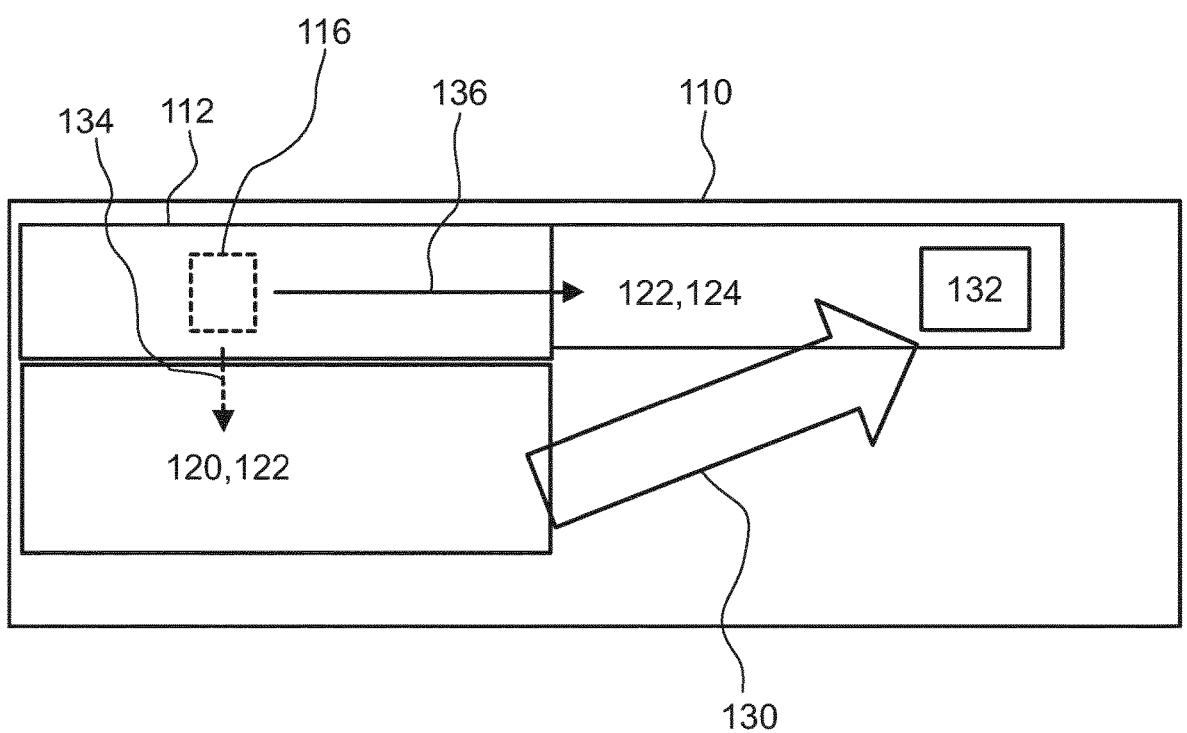
FIG. 2 shows an embodiment of a mobile device according to the present invention.

FIG. 1 shows a flowchart of an embodiment of a method for authenticating a user of a mobile device 110. The mobile device 110 may be a mobile electronics device, more specifically to a mobile communication device such as a cell phone or smart phone. Additionally or alternatively, the mobile device 110 may also refer to a tablet computer or another type of portable computer. The user may be a person using the mobile device 110. An embodiment of the mobile device 110 is shown highly schematically in FIG. 2. The user may be an owner of the mobile device 110 and/or otherwise authorized person. The authentication may comprise distinguishing between the user from other humans or objects, in particular between authorized access from non-authorized accesses. The authentication may comprise verifying identity of a respective user and/or assigning identity to a user. The authentication may comprise generating and/or providing identity information, e.g. to other devices or units such as to at least one authorization unit for authorization for performing a payment process. The identify information may be proofed by the authentication. For example, the identity information may be and/or may comprise at least one identity token. In case of successful authentication an image of a face recorded by a camera 112 of the mobile device 110 may be verified to be an image of the user's face and/or the identity of the user is verified.

The method comprises the following steps:

a) (denoted with reference number 114) imaging at least one first image 116 of a face by using the at least one camera 112 of the mobile device 110;

b) (denoted with reference number 118) providing the first image 116 to a regular execution environment 120 of a processor 122 of the mobile device 110 and providing the first image 116 to a trusted execution environment 124 of the processor 122;
c) (denoted with reference number 126) analyzing the first image 116 using at least one trained model in the regular execution environment 120 thereby determining a multi-dimensional vector comprising image information;
d) (denoted with reference number 128) a face verification step comprising:
  di) (denoted with arrow 130 in FIG. 2) providing the multi-dimensional vector to the trusted execution environment 124,
  dii) determining a second image from the multi-dimensional vector in the trusted execution environment 124 by using at least one decoder 132, and
  diii) comparing the first image 116 and the second image, wherein in case the first image 116 and the second image are identical the multi-dimensional vector is verified;
  div) in case the multi-dimensional vector is verified, the verified multi-dimensional vector is compared to a stored multi-dimensional vector of the user's face in the trusted execution environment 124, wherein in case the multi-dimensional vector and the stored multi-dimensional vector of the user's face are identical the user is authenticated.

The camera 112 may have at least one imaging element configured for recording or capturing spatially resolved one-dimensional, two-dimensional or even three-dimensional optical data or information. As an example, the camera 112 may comprise at least one camera chip, such as at least one CCD chip and/or at least one CMOS chip configured for recording images. For example, the camera 112 may be a color camera, as will be described in detail below, comprising at least three color pixels. The camera 112 may be a color CMOS camera. For example, the camera 112 may comprise black and white pixels and color pixels. The color pixels and the black and white pixels may be combined internally in the camera. The camera may comprise at least one color camera and at least one black and white camera, such as a black and white CMOS. The camera 112 may comprise at least one black and white CMOS chip. The camera 112 generally may comprise a one-dimensional or two-dimensional array of image sensors, such as pixels.

The first image 116 may be an initial image imaged by using the camera 112. The first image 116 may comprise raw image data or may be a pre-processed image. For example, the pre-processing may comprise applying at least one filter to the raw image data and/or at least one background correction and/or at least one background subtraction. The first image may comprise a scene comprising the face. The pre-processing may comprise one or more of performing a face detection and/or selecting a region of interest. The region of interest may be determined manually or may be determined automatically, such as by recognizing a feature within the first image. The pre-processing of the first image 116 may be performed by the camera 112 and/or by the processor 122 of the mobile device 110.

The regular execution environment 120 may be designed as described in GlobalPlatform Technology, TEE System Architecture, Version 1.2, Public Release November 2018, document reference: GPD_SPE_009, or www.qualcomm.com/media/documents/files/guard-your-data-with-the-qualcomm-snapdragon-mobile-platform.pdf, or www.arm.com/why-arm/technologies/trustzone-for-cortex-a/tee-reference-documentation. The regular execution environment 120 may be an execution environment of the processor comprising at least one device operating system (OS) and/or Rich operating system (Rich OS) and all other components of the processor 122, in particular at least one system-on-chip (SoC), other discrete components, firmware, and software, which are configured for executing, hosting, and supporting the OS and/or Rich OS. The SoC may be an electronic system all of whose components are included in a single integrated circuit. The regular execution environment 122 may exclude any trusted execution environment and secure elements (SEs) included in the mobile device. Specifically, the regular execution environment 122 may be everything outside of the trusted execution environment. The regular execution environment 122, in particular due to the size and needs of the OS and/or Rich OS, may run in an execution environment outside of hardware of the trusted execution environment. The regular execution environment 122 may have much lower physical security boundaries compared to the trusted execution environment. Thus, the regular execution environment 122 may be considered as untrusted. However, internal trust structures may be present in the regular execution environment 122.

The trusted execution environment 124 may be designed as described in GlobalPlatform Technology, TEE System Architecture, Version 1.2, Public Release November 2018, document reference: GPD_SPE_009, or www.qualcomm.com/media/documents/files/guard-your-data-with-the-qualcomm-snapdragon-mobile-platform.pdf, or www.arm.com/why-arm/technologies/trustzone-for-cortex-a/tee-reference-documentation. The trusted execution environment 124 may be an execution environment comprise at least one security capability and fulfills at least one security requirement. The trusted execution environment 124 may be configured for protecting assets within the trusted execution environment 124 from general software attacks. The trusted execution environment 124 may be configured for defining rigid safeguards as to data and functions that a program can access. The trusted execution environment 124 may be configured for resisting a set of defined threats. Multiple technologies are known for implementing a trusted execution environment and the level of security achieved may vary accordingly. Specifically, the trusted execution environment 124 may fulfill security requirements as described in source.android.com/compatibility/11/android-11-cdd#7_3_10_biometric_sensors. The TEE 124 may operate, in particular while biometric based authentication or enrollment is happening, the camera 112 in a mode that prevents camera frames from being read or altered outside the TEE 124 or a chip with a secure channel to the TEE 124. For RGB single-camera solutions, the camera frames may be readable outside the TEE 124 to support operations such as preview for enrollment, but may still not be alterable.

The TEE 124 may not allow unencrypted access to identifiable biometric data or any data derived from it (such as embeddings) to parts of the processor outside the context of the TEE 124. The TEE 124 may have a secure processing pipeline such that an operating system or kernel compromise cannot allow data to be directly injected to falsely authenticate as the user. The TEE 124 may have a hardware-backed keystore implementation. The TEE 124 may have all identifiable data encrypted and cryptographically authenticated such that they cannot be acquired, read or altered outside of the TEE 124 or a chip with a secure channel to the TEE 124. The TEE 124 may prevent adding new biometrics without first establishing a chain of trust by having the user confirm existing or add a new device credential, e.g. PIN and/or pattern and/or password) that's secured by TEE 124.

The trusted execution environment 124 may be an execution environment isolated from the regular execution environment 120. The trusted execution environment 124 may be isolated from the regular execution environment 120 by one or more of physical isolation, hardware logic based isolation, or cryptographic isolation methods. Specifically, the trusted execution environment 124 may be isolated from the regular execution environment 120 by electronic access control through TEE system hardware, that can be configured by TEE resident boot or run-time software.

The first image 116 may be provided to the regular execution environment 120 via a regular path 134. The regular path 134 may be an untrusted path. The regular path 134 may be configured for allowing access by software within the regular execution environment 120 and/or the trusted execution environment 124. The first image 116 may be provided to the trusted execution environment 124 via a secure path 136, wherein the secure path 136 may be configured for preventing the first image 116 to be derived and/or modified by any software within the regular execution environment 120.

The analyzing of the first image 116 is performed in the regular execution environment 120. Thus, high computing power and memory capacity may be available for analyzing the first image 116.

The analyzing in step c) may comprise one or more of filtering and convoluting of the first image 116. The trained model may comprise at least one face recognition model. The analyzing of the first image may be performed by using a face recognition system, such as FaceNet. Thus, the face recognitions system may be designed as described in Florian Schroff, Dmitry Kalenichenko, James Philbin, "FaceNet: A Unified Embedding for Face Recognition and Clustering", arXiv:1503.03832.

The trained model may comprises at least one convolutional neural network. For example, the convolutional neural network may be designed as described in M. D. Zeiler and R. Fergus, "Visualizing and understanding convolutional networks", CoRR, abs/1311.2901, 2013, or C. Szegedy et al., "Going deeper with convolutions", CoRR, abs/1409.4842, 2014. For more details with respect to convolutional neural network for the face recognition system reference is made to Florian Schroff, Dmitry Kalenichenko, James Philbin, "FaceNet: A Unified Embedding for Face Recognition and Clustering", arXiv:1503.03832.

As training data labelled image data from an image database may be used. Specifically, labeled faces may be used from one or more of G. B. Huang, M. Ramesh, T. Berg, and E. Learned-Miller, "Labeled faces in the wild: A database for studying face recognition in unconstrained environments", Technical Report 07-49, University of Massachusetts, Amherst, October 2007, the Youtube® Faces Database as described in L. Wolf, T. Hassner, and I. Maoz, "Face recognition in unconstrained videos with matched background similarity", in IEEE Conf. on CVPR, 2011, or Google® Facial Expression Comparison dataset. The training of the convolutional neural network may be performed as described in Florian Schroff, Dmitry Kalenichenko, James Philbin, "FaceNet: A Unified Embedding for Face Recognition and Clustering", arXiv:1503.03832.

The output of the analyzing in step c) using the trained model may be a multi-dimensional vector. The multi-dimensional vector may be an embedding, specifically a lower-dimensional representation of the first image. Determining a multi-dimensional vector from the first image as input to the trained model may be performed as described in Florian Schroff, Dmitry Kalenichenko, James Philbin, "FaceNet: A Unified Embedding for Face Recognition and Clustering", arXiv:1503.03832. Specifically, the trained model may determine from the first image a vector of 128 numbers. The entries of the multi-dimensional vector may be features of the imaged face. The image information may be embedded and/or mapped into the multi-dimensional vector. The image information may be any parameters of the first image 116 characterizing and/or defining the first image 116. The image information may be information allowing to a comparison to another image information to verify the similarity of a person's face. The image information may be information allowing reconstruction of the first image 116 using the embedding.

The multi-dimensional vector is provided to the trusted execution environment 124. The providing of the multi-dimensional vector may be performed by using at least one interface between the regular execution environment 120 and the trusted execution environment 124, in particular by access of the trusted execution environment 124 to the regular execution environment 120.

In the trusted execution environment 124, a second image from the multi-dimensional vector is determined by using the at least one decoder 132. The second image may be an image reconstructed from the multi-dimensional vector. The determining of the second image may comprises the decoder 132 reconstructing the image of the user's face from the multi-dimensional vector. The decoder 132 may be at least one element of the trusted execution environment 124 configured for reconstructing an image from embeddings, in particular from the multi-dimensional vector. Such decoders 132 and their working principles are generally known to the skilled person, e.g. as described in papers.nips.cc/paper/2014/file/a14ac55a4f27472c5d894ec1c3c743d2-Paper.pdf.

The method comprises comparing the first image 116 and the second image. The comparison may be performed by the processor 120 in the trusted execution environment. The comparison may comprise comparing at least one feature of the first image 116 and the second image, in particular a plurality of features. The features used for comparison may be pre-defined. The features of the first image 116 and the feature of the second image are based on identical image data, but the features were generated by using different algorithms. In particular the features comprised by the multi-dimensional vector were determined by the face recognition algorithm as described above. The multi-dimensional vector was determined from the first image 116 which is also deposited in the TEE. Additionally or alternatively, the first image 116 and the second image may be compared with a similarity measure, e.g. pixelwise. In case the first image and the second image are identical the multi-dimensional vector is verified.

In case the multi-dimensional vector is verified, the verified multi-dimensional vector is compared to a stored multi-dimensional vector of the user's face in the trusted execution environment 124. Otherwise, the procedure may be aborted and/or restarted. In case the multi-dimensional vector and the stored multi-dimensional vector of the user's face are identical the user is authenticated. The multi-dimensional vector of the user's face may be stored in at least one memory of the TEE 124. As outlined above, the embedding describes a mathematical representation of face-features which can be compared to each other, e.g. by using a scalar product.

In case the multi-dimensional vector is verified, the verified multi-dimensional vector is compared to a stored multi-dimensional vector of the user's face in the trusted execution environment. Otherwise, the procedure may be aborted and/or restarted. In case the multi-dimensional vector and the stored multi-dimensional vector of the user's face are identical the user is authenticated. The multi-dimensional vector of the user's face may be stored in at least one memory of the TEE. As outlined above, the embedding describes a mathematical representation of face-features which can be compared to each other, e.g. by using a scalar product.

As further shown in FIG. 1, subsequent to performing the method for authentication an authorization step may be performed. The trusted execution environment 124 may output a signal for authorizing a process step (denoted with reference number 138. The process step comprises one or more of payment, signing of documents, access of the mobile device 110, enabling applications such as BiometricPrompt and/or FIDO2 APIs, see source.android.com/security/biometric/measure.

Performing image analysis in the unsecure regular execution environment 120 may allow using the full computing power and memory capacity of the regular execution environment 120. Proofing the result of the image analysis obtained in the regular execution environment 120 by comparing to the first image 116 stored in the trusted execution environment 124 allows authentication of the user with enhanced security.

LIST OF REFERENCE NUMBERS 110 mobile device
112 camera
114 imaging
116 first image
118 providing the first image
120 regular execution environment
122 processor
124 trusted execution environment
126 analyzing the first image
128 step d)
130 providing the multi-dimensional vector
132 decoder
134 regular path
136 secure path
138 outputting a signal for authorizing a process step

The invention claimed is:

1. An authentication method for authenticating a user of a mobile device comprising the following steps:
   a) imaging at least one first image of a face by using at least one camera of the mobile device;
   b) providing the at least one first image to a regular execution environment of a processor of the mobile device and providing the at least one first image to a trusted execution environment of the processor;
   c) analyzing the at least one first image using at least one trained model in the regular execution environment thereby determining a multi-dimensional vector comprising image information; and
   d) a face verification step comprising:
      di) providing the multi-dimensional vector to the trusted execution environment;
      dii) determining a second image from the multi-dimensional vector in the trusted execution environment by using at least one decoder;
      diii) comparing the at least one first image and the second image, wherein in case the first image and the second image are identical the multi-dimensional vector is verified; and
      div) in case the multi-dimensional vector is verified, the verified multi-dimensional vector is compared to a stored multi-dimensional vector of the user's face in the trusted execution environment, wherein in case the multi-dimensional vector and the stored multi-dimensional vector of the user's face are identical the user is authenticated.

2. The authentication method according to claim 1, wherein the trusted execution environment is an execution environment isolated from the regular execution environment.

3. The authentication method according to claim 2, wherein the trusted execution environment is isolated from the regular execution environment by one or more of physical isolation, hardware logic based isolation, and cryptographic isolation methods.

4. The authentication method according to claim 1, wherein the trusted execution environment comprises at least one security capability and fulfills at least one security requirement.

5. The authentication method according to claim 1, wherein the at least one first image is provided to the regular execution environment via a regular path, wherein the regular path is configured for allowing access by software within the regular execution environment and/or the trusted execution environment.

6. The authentication method according to claim 1, wherein the at least one first image is provided to the trusted execution environment via a secure path, wherein the secure path is configured for preventing the at least one first image to be derived and/or modified by any software within the regular execution environment.

7. The authentication method according to claim 1, wherein the determining of the second image comprises the decoder reconstructing the image of the user's face from the multi-dimensional vector.

8. The authentication method according to claim 1, wherein the trained model comprises at least one face recognition model.

9. The authentication method according to claim 1, wherein the trained model comprises at least one convolutional neural network.

10. The authentication method according to claim 1, wherein the analyzing in step c) comprises one or more of filtering and convoluting of the at least one first image.

11. An authorization method for authorization of a user, wherein the authorization method comprises:
    performing the authentication method according to claim 1; and
    outputting, by the trusted execution environment, a signal for authorizing a process step, wherein the process step comprises one or more of payment, signing of documents, access of the mobile device, and enabling applications.

12. A non-transitory computer-readable storage medium comprising instructions which, when executed by a computer or computer network, cause the computer or computer network to carry out the authentication method according to claim 1.

13. A mobile device comprising at least one camera and at least one processor, the mobile device being configured for performing the authentication method according to claim 1.

14. A method of using the mobile device according to claim 13, the method comprising using the mobile device for one or more of payment and signing of documents.

15. A non-transitory computer-readable storage medium comprising instructions which, when executed by a computer or computer network, cause the computer or computer network to carry out the authorization method according to claim 11.

16. A mobile device comprising at least one camera and at least one processor, the mobile device being configured for performing the authorization method according to claim 11.

17. A method of using the mobile device according to claim 16, the method comprising using the mobile device for one or more of payment and signing of documents.

* * * * *